United States Patent
Slodkowski

[19]

[11] Patent Number: 5,884,744
[45] Date of Patent: Mar. 23, 1999

[54] WHEEL BRAKE

[76] Inventor: Jan S. Slodkowski, 109 Burnet Park Dr. #4, Syracuse, N.Y. 13204

[21] Appl. No.: 880,598

[22] Filed: Jun. 23, 1997

[51] Int. Cl.⁶ .................................................. B65G 13/075
[52] U.S. Cl. ........................... 193/35 A; 188/22; 188/74; 188/77 R
[58] Field of Search ............................. 193/35 A; 188/74, 188/77 R, 2 R, 22, 32

[56] References Cited

U.S. PATENT DOCUMENTS

| | | | |
|---|---|---|---|
| 2,590,994 | 4/1952 | McKay . | |
| 2,841,250 | 7/1958 | Osborn | 188/74 |
| 3,059,728 | 10/1962 | McKuskie | 188/74 |
| 5,086,903 | 2/1992 | Agnoff . | |
| 5,381,680 | 1/1995 | Rauch, Jr. . | |

FOREIGN PATENT DOCUMENTS 616201  7/1978  U.S.S.R. .............................. 193/35 A

*Primary Examiner*—Joseph E. Valenza
*Assistant Examiner*—Mark Deuble
*Attorney, Agent, or Firm*—Wall Marjama Bilisnki & Burr

[57] ABSTRACT

A brake for tandem wheels comprising a block that is shaped to conform to a portion of the circumferential surface of each of the wheels. The block is positioned to be in continuous frictional engagement with the circumferential surface of each of the wheels so that a constant force is applied to each of the wheels. When one of the wheels is stopped due to an external force, the mechanical forces that are built through the continuous frictional engagement result in the block exerting a braking force against the circumferential surface of the other wheel.

2 Claims, 3 Drawing Sheets

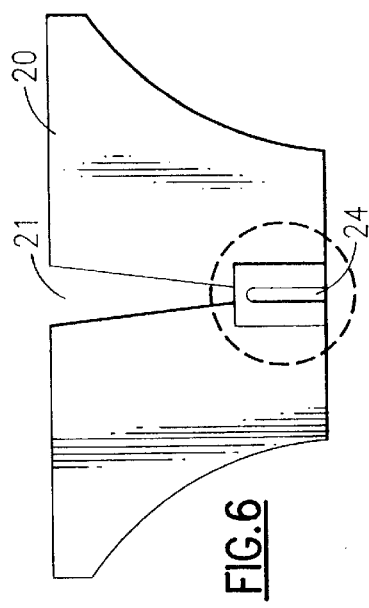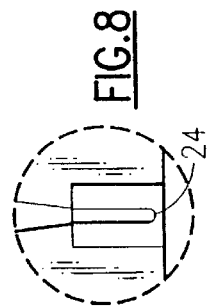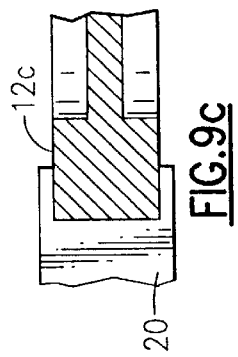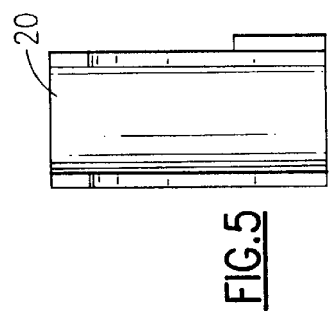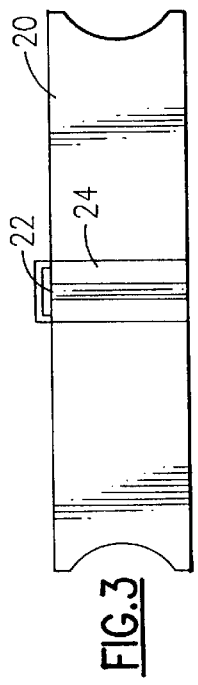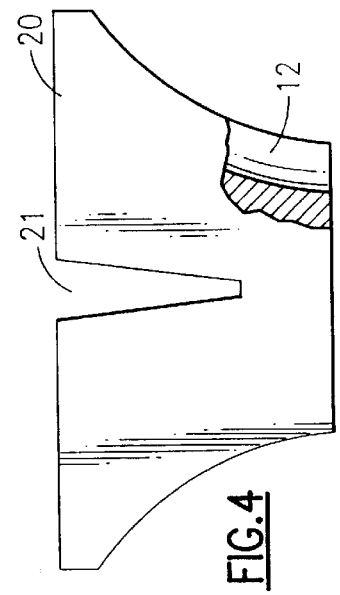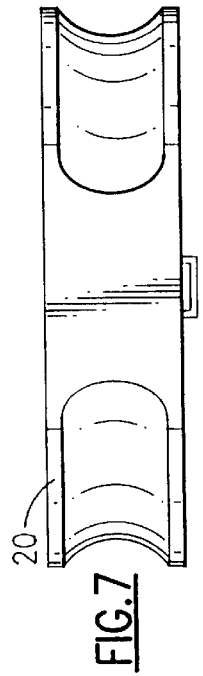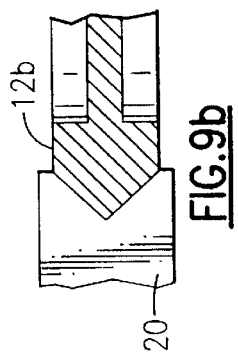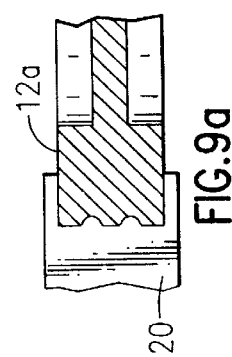

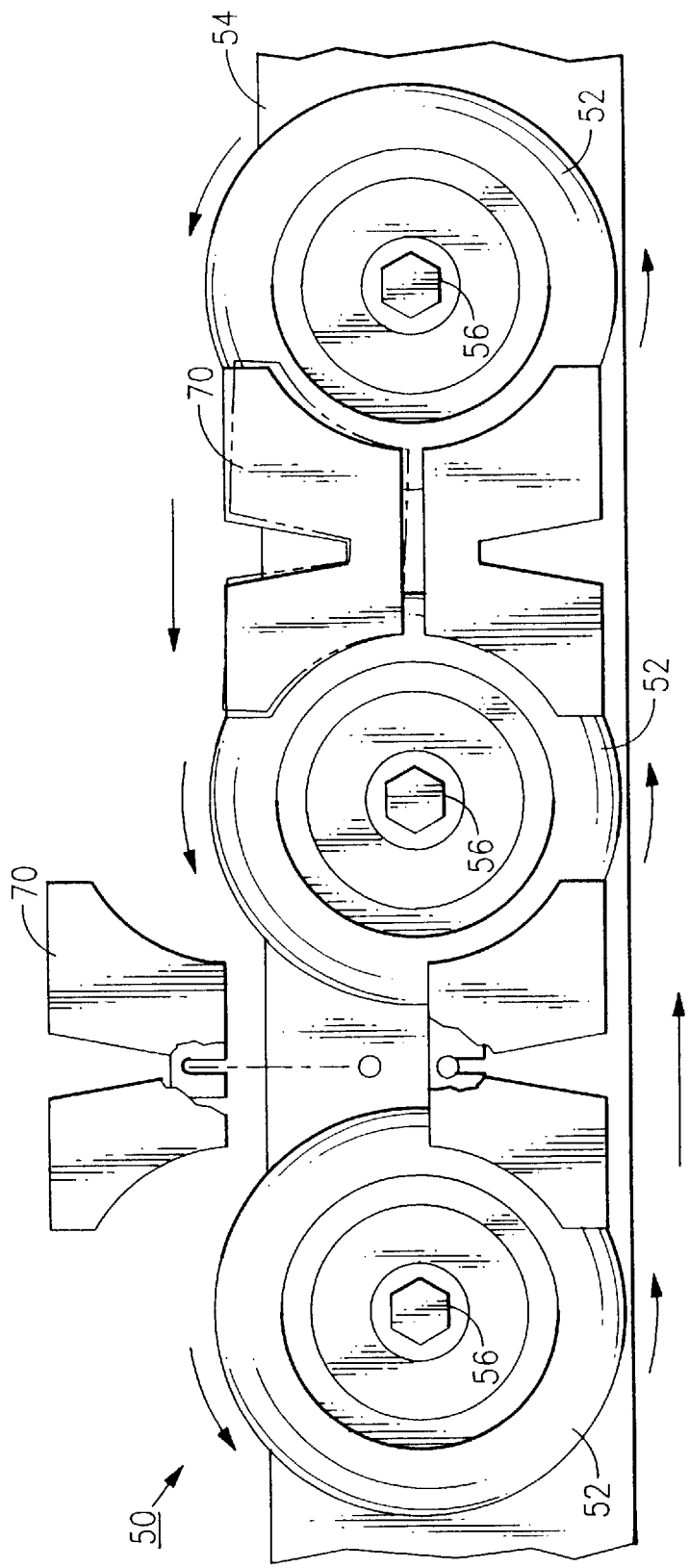

WHEEL BRAKE

FIELD OF THE INVENTION

This invention relates generally to braking systems, and specifically to brake to be used for wheels that are positioned in axially-parallel tandem configurations.

BACKGROUND AND SUMMARY OF THE INVENTION

There are numerous situations where wheels are placed in close proximity to one another in axially-parallel tandem configurations. For example, the wheels of a roller conveyor system are so configured, as are the wheels of tandem truck or truck trailer. In many situations it is desirable to provide a braking force to the wheels and there are numerous examples in the prior art of devices that can apply a braking force to wheels that are configured in tandem.

U.S. Pat. No. 2,590,994 to McKay discloses a braking apparatus for roller conveyors. The apparatus comprises an elongated block that is generally wedge-shaped and is located between two adjacent rollers. The narrower edge of the block is downwardly positioned. The apparatus has means to move the block in a generally vertical direction in order to cause the sides of the block to frictionally engage the rollers and thereby the block applies a braking force to the rollers.

U.S. Pat. No. 5,086,903 to Agnoff discloses a tandem wheel brake roller system for use in gravity conveyors. A brake roller is mounted below the conveyor. Two floating rollers are rotatably mounted above the brake roller. When a load bearing item engages the floating rollers, the floating rollers are forced downward into engagement with the brake roller. The brake roller thereby applies a braking force to the floating rollers.

U.S. Pat. No. 5,381,680 to Rauch discloses a retractable wheel lock assembly that includes a telescoping security tube on which a wedge-shaped brake member is mounted. The security tube is moveable between a first, retracted position and a second, extended position. The wedge-shaped brake member frictionally engages the wheels when the telescoping security tube is moved to the extended position. The brake-member thereby applies a braking force to the wheels.

Although the prior art has many examples of braking systems for tandem wheels, it is heretofore unknown to provide a braking system that can apply a braking force to one of the wheels in direct reaction to the other wheel being stopped through external forces. For example, in a roller conveyer system, the wheels may be mechanically driven by an external drive shaft and one of the wheels may experience a loss of mechanical drive. In that situation, it would be desirable to immediately stop the adjacent wheels from rotating. Currently, one might employ an electronic sensing system to determine that a particular wheel had stopped and the system could then command other elements to provide braking force to the adjacent wheels using one of the prior art devices. However, it would be desirable to have a purely mechanical system that could immediately apply a braking force to an adjacent rotating wheel in direct reaction to the stoppage of one of the other wheels, regardless of the reason for the stoppage.

It is therefore an object of the present invention to provide an improved braking system for axially-parallel tandem wheel configurations.

It is another object of the present invention to provide a braking system for axially-parallel tandem wheel configurations that utilizes the forces created by the mechanically driven wheels to provide the braking forces needed to brake one of the wheels when one of the other wheels is braked due to external forces.

The present invention addresses these objects as well as other problems associated with braking systems for axially-parallel tandem wheel arrangements. The present invention provides a block that is shaped to conform to a portion of the circumferential surface of each of the wheels. The block is positioned to be in continuous frictional engagement with the circumferential surface of each of the wheels so that a constant force is applied to each of the wheels. When one of the wheels is stopped due to an external force, the mechanical forces that are built through the continuous frictional engagement result in the block exerting a braking force against the circumferential surface of the other wheel.

BRIEF DESCRIPTION OF THE DRAWING

For a fuller understanding of the nature and objects of the invention, reference should be made to the following detailed description of a preferred mode of practicing the invention, read in connection with the accompanying drawings, in which:

FIG. 3 is a top view of one embodiment of the present invention.

FIG. 4 is a front view of one embodiment of the present invention with a partial cut-away.

FIG. 5 is a lateral view of one embodiment of the present invention.

FIG. 6 is a front view of one embodiment of the present invention.

FIG. 7 is a bottom view of one embodiment of the present invention

FIG. 8 is an enlarged front view of the delineated portion of FIG. 6.

FIG. 9a is a cross-sectional view of one embodiment of the present invention.

FIG. 9b is a cross-sectional view of another embodiment of the present invention.

FIG. 9c is a cross-sectional view of a third embodiment of the present invention.

FIG. 10 is a a side view of a roller conveyor system utilizing an embodiment of the present invention.

DETAILED DESCRIPTION OF THE INVENTION

Figure 1:
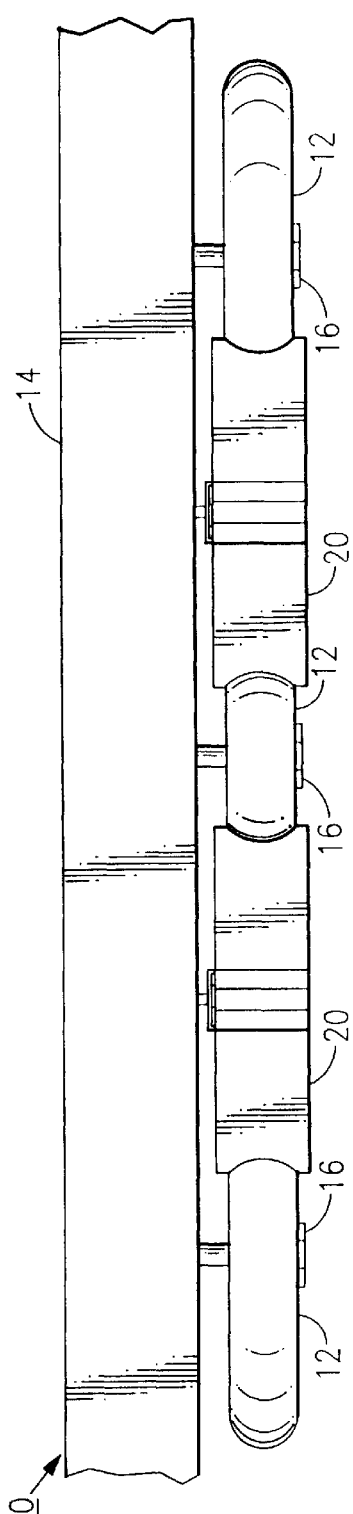
FIG. 1 is a top view of a roller conveyor system utilizing an embodiment of the present invention.

Referring now to FIG. 1, there is shown a portion of a conveyor system with one embodiment of the present invention contained therein. It is understood by one skilled in the art that there can be numerous uses for the present invention other than in conveyor systems. The present invention can be utilized in any situation where there are adjacent wheels and the illustration of its use in a conveyor system is only meant to be illustrative and not meant to be a limitation of the potential applications of the invention.

Figure 2:
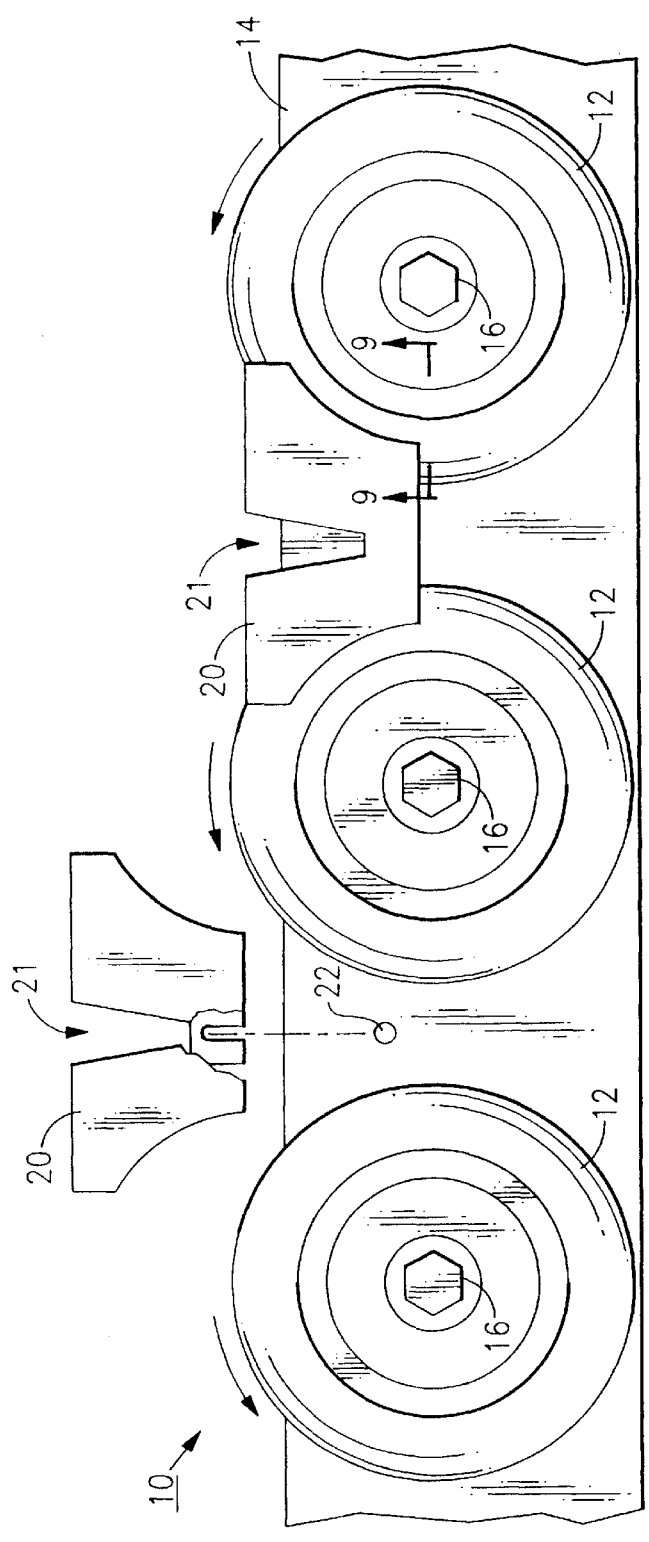
FIG. 2 is a side view of a roller conveyor system utilizing an embodiment of the present invention.

The conveyor system 10 comprises a series of wheels/ rollers 12 contained in a frame 14. There is shown in FIG. 1 and FIG. 2 a portion of a conveyor system and one skilled in the art would recognize that the length of the system and the number of wheels employed in the system would vary depending on the needs of the particular system. The wheels 12 are arranged in tandem and located in close enough proximity so that a load (not shown) may be moved along the system. The wheels 12 are typically connected to the frame 14 by an axle 16 that can be mechanically driven by motors (not shown) that are contained within the system, or the wheels can be free-moving such as in a gravity-powered conveyor system. The axles 16 of the wheels 12 are in approximately parallel configurations to one another. The brake 20 is located between adjacent wheels 12.

The brake 20 is formed in the shape of a block and can be manufactured from any material that would be suitable for the particular application in which it is being employed. For example, some of the materials that may be suitable to manufacture the brake include metal, rubber, or any of the synthetic rubbers. The brake 20 is configured to be placed between two adjacent wheels 12. The brake 20 may rest freely between the wheels 12 or the brake 20 may be secured to the frame 14 by any suitable attachment means such as the pin attachment 22 depicted in FIGS. 1 and 2. Referring now to FIGS. 2, 3, 6 and 8, if a pin attachment 22 is used to secure the brake 20 to the frame 14, a suitable fastening slot 24 is formed in the brake 20 to accept the pin attachment 22. However, one skilled in the art would recognize numerous methods of securing the brake 20 to the frame 14. Also, there may be additional systems used to position the brake 20 and to exert force on the brake 20 in a direction perpendicular to the plane of the axles 16 by the use of mechanical, pneumatic, or hydraulic apparatuses (not shown).

The brake 20 is shaped to conform to the circumferential surface of the wheels 12, as depicted in FIG. 4. Referring now to FIG. 5 and FIG. 7, the side of the brake 20 is shown further illustrating the conformation to the circumferential edge of the wheels 12. Of course, the circumferential edge of the wheels 12 may vary depending on the particular use and it is understood by one skilled in the art that the shape of the brake 20 will conform to the circumferential edge or surface of the wheel 12 regardless of the shape of the wheel 12. As examples, three different circumferential surface shapes are depicted in FIGS. 9a, 9b, and 9c Referring again to FIG. 2, the arrows indicate the direction of travel of the wheels 12. The brake 20 is positioned such that the brake 20 is in continuous engagement with the circumferential surfaces of the wheels 12. Due to the continuous engagement of the circumferential surfaces of the wheels 12 and the brake 20, there are resulting frictional forces that are exerted on the brake 20. When the wheels 12 are being driven, the brake 20 will have a force directed in a generally upward direction by one of the wheels 12 and will have an equal force directed in a generally downward direction by the adjacent wheel 12 so that the forces are in equilibrium. When one of the wheels 12 is braked or stopped due to external forces, the force exerted against the brake 20 that is associated with the stopped wheel will diminish while the force associated with the adjacent wheel remains constant. In that instance, the forces exerted against the brake 20 are not in equilibrium and thereby the brake 20 reacts to the non-equilibrium condition by exerting a braking force on the wheel which is still in motion. Of course, the brake 20 will operate in the described manner regardless of which direction the load is being moved by the wheels 12.

As an additional feature, the brake 20 may have a compression slot 21 formed into the body to facilitate smooth braking and to avoid lock-brake effects. Of course, the compression slot 21 will vary in size depending upon various factors such as the elasticity of the particular construction materials used in fabricating the brake 20 and it is within the knowledge of one skilled in the art to determine suitable compression slot configurations.

Referring now to FIG. 10, there is an additional embodiment of the present invention depicted. There is shown a portion of a conveyor system 50 that is configured to carry a load (not shown). The conveyor system 50 comprises a series of wheels/rollers 52 contained in a frame 54. The wheels 52 are arranged in tandem and located in close enough proximity so that a load (not shown) may be moved along the system and the direction that the load is moved can be changed by changing the drive imparted to the wheels 52 The wheels 52 are connected to the frame 54 by an axle 56. In this embodiment, the brakes 70 are located between the adjacent wheels and the brakes 70 are positioned both above and below the plane of the axles of the wheels 52. In this way, when a load is moved in one direction, the brakes 70 positioned above the axles 56 are employed, and when a load is moved in the opposite direction, the brakes 70 positioned below the axles 56 are employed. The brakes 70 may be employed by positioning the brakes 70 into and out of engagement with the wheels 56 through the use of mechanical, hydraulic, or pneumatic devices.

While the present invention has been particularly shown and described with reference to the preferred mode as illustrated in the drawings, it will be understood by one skilled in the art that various changes in detail may be effected therein without departing from the spirit and scope of the invention as defined by the claims. One skilled in the art would recognize that the brake as described herein can be utilized on any wheeled configuration, not confined to roller conveyers, that allows for the placement of the brake such that the brake would operate in a manner consistent with the description.

I claim:

1. An apparatus for providing a braking force to either of two adjacent wheels having circumferential surfaces, said apparatus comprising:

a block, said block shaped to conform to a portion of the circumferential surface of each of the wheels, said block positioned to be in continuous frictional engagement with the circumferential surface of each of the wheels via a means for rotatably supporting said block which limits the movement of said block away from said wheels so that a constant frictional force is simultaneously applied to each of the wheels by said block, such that when one of the wheels is stopped due to an external force said block is driven through said frictional force of the other wheel whereby said block pivots in position causing a braking force against the circumferential surface of the other wheel, said block comprising a compression slot.

2. An apparatus for providing a braking force to either of two adjacent wheels having circumferential surfaces, said apparatus comprising:

a block, said block shaped to conform to a portion of the circumferential surface of each of the wheels;

means for rotatably supporting said block which limits the movement of said block away from said wheels to position said block into continuous frictional engagement with the circumferential surface of each of the wheels so that a constant frictional force is simultaneously applied to each of the wheels by said block, such that when one of the wheels is stopped due to an external force said block is driven through said frictional force of the other wheel whereby said block pivots in position causing a braking force against the circumferential surface of the other wheel, said block comprising a compression slot.

* * * * *